United States Patent [19]
Wilson et al.

[11] 3,792,195
[45] Feb. 12, 1974

[54] SIGNAL MONITOR FOR RECURRENT ELECTRICAL SIGNALS

[75] Inventors: Kenneth A. Wilson, Locust Valley, N.Y.; Graham D. Bogel, Woodbury, Conn.

[73] Assignee: American Chain & Cable Company, Inc., New York, N.Y.

[22] Filed: May 25, 1972

[21] Appl. No.: 256,917

[52] U.S. Cl.......... 178/6.8, 178/DIG. 4, 178/5.4 TE, 324/73 R, 325/67, 325/363, 328/187, 328/188
[51] Int. Cl. ............................................ H04n 7/02
[58] Field of Search ...... 178/6.8, 6, DIG. 4, 5.4 TE; 325/67, 363; 324/73 R; 328/187, 188

[56] References Cited

UNITED STATES PATENTS 3,659,044 4/1972 Olson ................................ 178/6.8
3,730,984 5/1973 Smith ............................ 178/DIG. 4

*Primary Examiner*—Howard W. Britton

[57] ABSTRACT

A television signal monitor for detecting and isolating selected portions of a composite television signal. The isolated portions of the television signal are temporarily stored in analog form in a plurality of parallel aligned sample and hold circuits. The sample and hold circuits are selectively gated by a programable counter-decoder circuit which generates gating pulses of selected duration at predetermined time intervals during the horizontal line intervals. The stored signals are sequentially sampled and converted to binary coded decimal form and then serially fed to a storage circuit or to a utilization circuit.

11 Claims, 8 Drawing Figures

SIGNAL MONITOR FOR RECURRENT ELECTRICAL SIGNALS

BACKGROUND OF THE INVENTION

This invention relates to a television signal monitor for detecting selectable portions of a composite television signal which portions are quantized and formed into a serial train of binary coded decimal signals.

In a typical television system, a sensing element is scanned over the image that is to be transmitted. The sensing element generates an electrical signal which is proportional to the brightness of the image at the position of the sensing element. This brightness signal is transmitted to a receiver where at least one electron beam is moved across the screen of a picture tube in a path corresponding to that taken by the sensing element. The intensity of the electron beam is controlled by the brightness signal and thus the original image is reproduced on the screen.

In order for a picture to be accurately reproduced, the television system must be provided with horizontal drive pulses to cause the electron beam of the receiver to scan horizontally. In addition, vertical drive pulses are required to cause the beam to be returned from the bottom to the top of the picture after the bottom line has been scanned. A subcarrier burst is also required to provide color reference information and equalizing pulses must be provided so that horizontal synchronization is not lost during the vertical synchronizing interval. These various signals are combined in a well-defined time relationship with respect to each other and transmitted along with the aforementioned brightness signal as a single composite television signal, the various components of which are then separated in a television receiver. It is very important that the voltage levels of the various components of the synchronizing and color reference signals in the composite television signal be accurate in order to insure a faithfully reproduced television picture and to comply with requirements set by the Federal Communications Commission (FCC). The task of monitoring these various signals has in the past been accomplished by two different techniques. The first method was simply to visually monitor the television picture as transmitted and to then make the necessary required adjustments to maintain proper synchronization, luminance, chrominance, etc. This method is characterized by human errors resulting from a subjective evaluation of objects and events that are being sensed. The second method involves displaying portions of a television signal on a cathode ray tube having a template mounted over the face thereof. The template illustrates the desired form of the portion of the television signal being displayed and, accordingly, a visual inspection can determine if the signal portion being tested is of proper form and magnitude. Both of the aforementioned techniques for monitoring and testing a composite television picture signal are subject to error because they are limited by the sensitivity of human eyesight.

It, therefore, is an object of this invention to provide an accurate television signal monitor method and apparatus for monitoring selectable portions of a composite television signal.

SHORT STATEMENT OF THE INVENTION

Accordingly, this invention relates to a television signal monitor that detects and isolates selected portions of a composite television signal. A plurality of sample and hold circuits are provided for temporarily storing the selected portions of the television signal and are gated by a programable decoder circuit which generates gating pulses of selected duration at predetermined time intervals during the respective horizontal intervals. The stored signals are sequentially sampled and converted to binary coded decimal form and then serially fed to a storage circuit or to a utilization device.

BRIEF DESCRIPTION OF THE DRAWINGS

Other objects, features and advantages of this invention will become more fully understood from the following detailed description, appended claims, and the accompanying drawings in which:

Figures 1, 2, 3, 4:
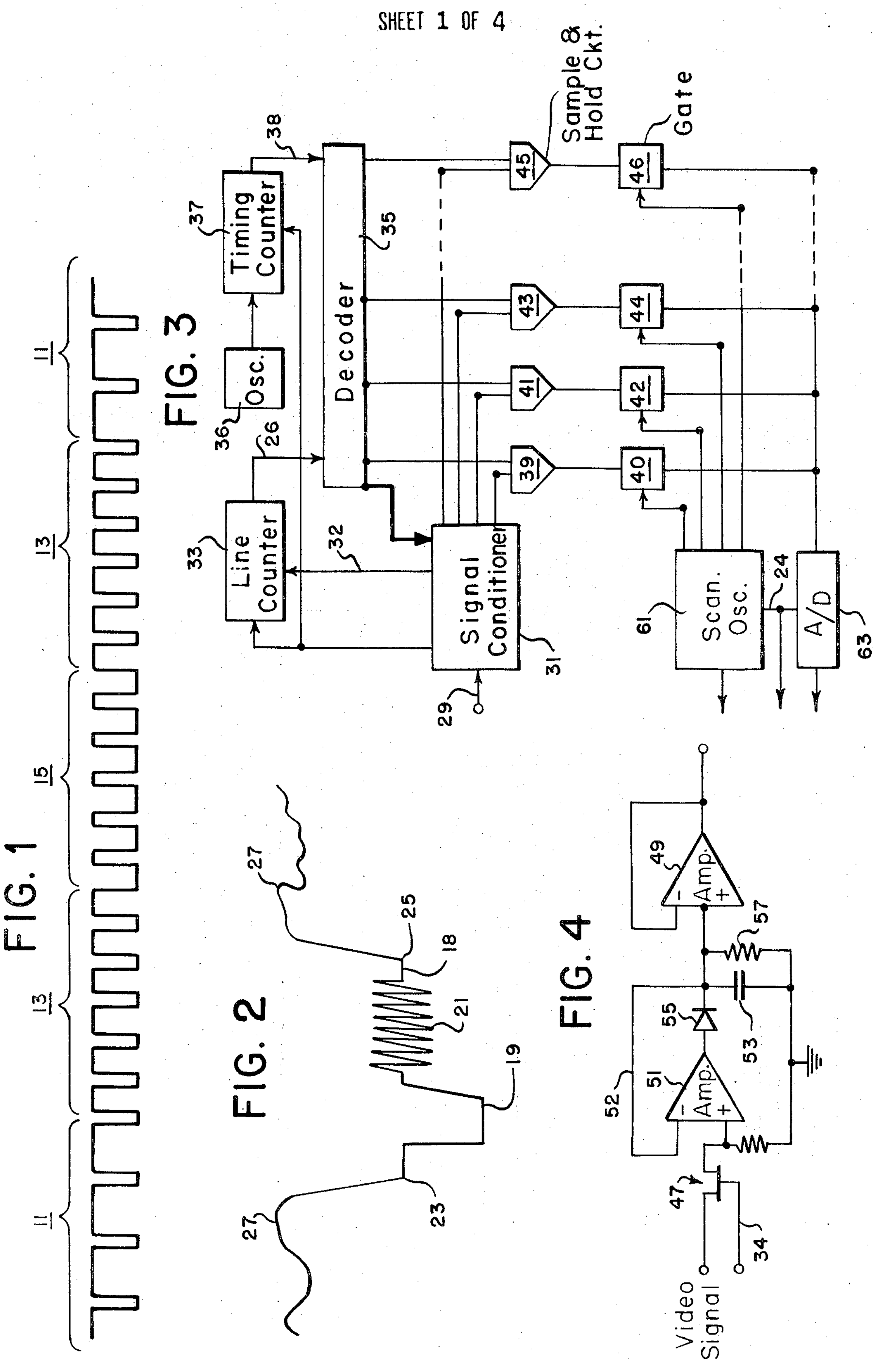
FIG. 1 is a graphical display of a vertical synchronization interval showing equalizing pulses and horizontal and vertical sync pulses.
FIG. 2 is a graphical display of a typical horizontal synchronization signal.
FIG. 3 is a block diagram of the television monitor of this invention.
FIG. 4 is a schematic diagram of a typical sample and hold circuit.
Figure 6:
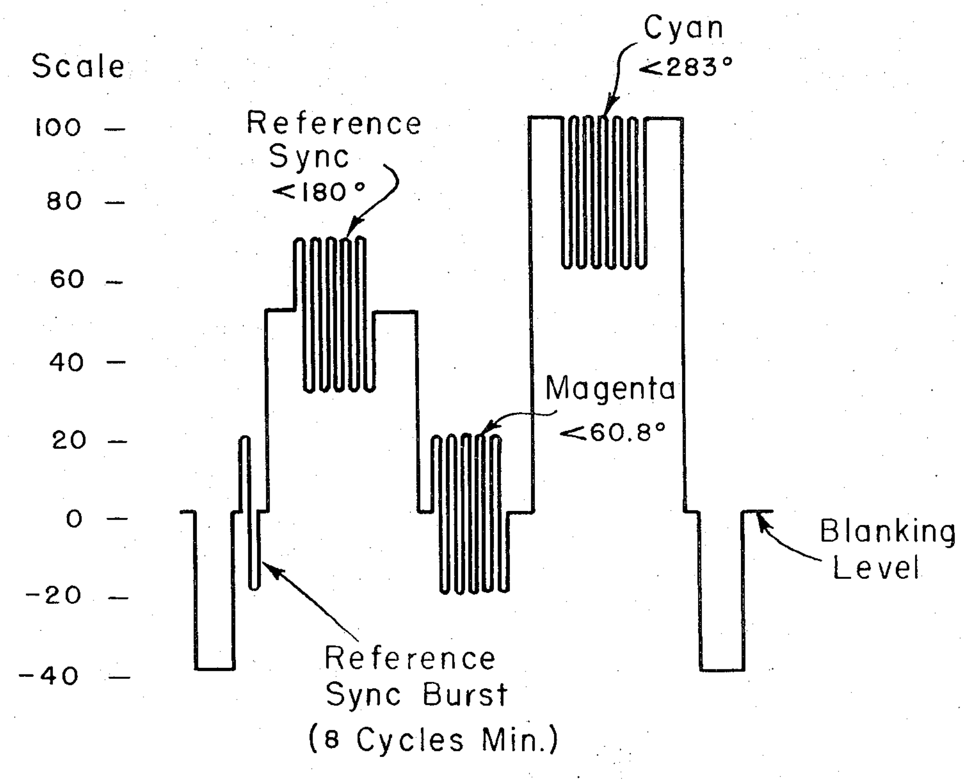

FIG. *5a* is a schematic diagram of a portion of the signal conditioner illustrated in FIG. 3;

FIG. *5b* is a portion of a composite video signal;

FIG. 6 is an example of a color test signal; and

Figure 7:
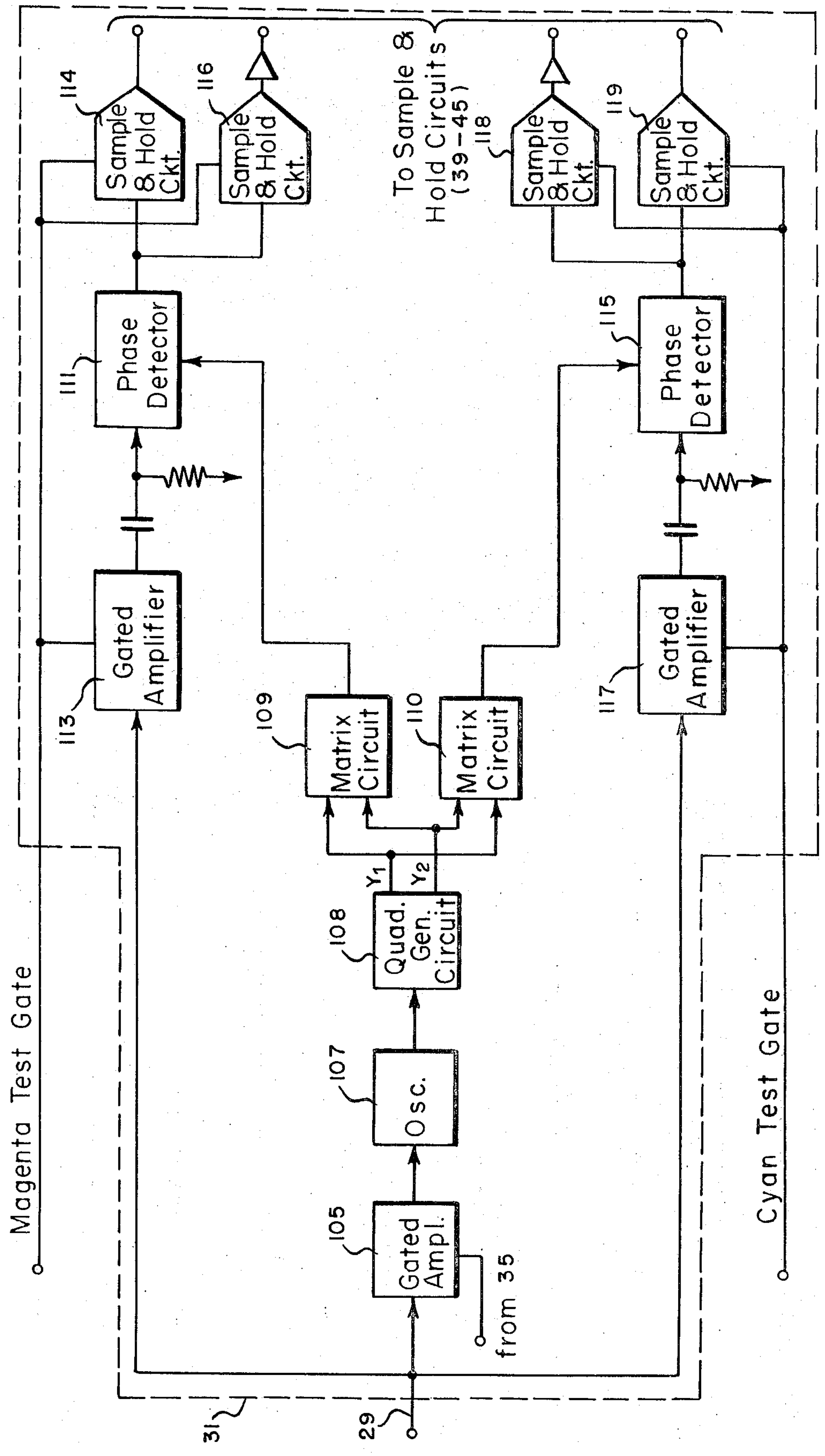

FIG. 7 is a schematic diagram of a portion of the signal conditional illustrated in FIG. 3.

BRIEF DESCRIPTION OF THE PREFERRED EMBODIMENT

There is shown in FIG. 1 a simplified graphical display of a train of synchronizing pulses, hereinafter designated sync pulses, including the pulses generated during the vertical sync interval. Numeral 11 denotes the horizontal synchronizing pulses which are spaced approximately 63.5 microseconds apart and have a duration of approximately 5 microseconds. Equalizing pulses 13 occur both before and after the vertical sync pulses 15 and at twice the rate of the horizontal sync pulses. The pulse width of the equalizing pulses is approximately one-half the width of the horizontal sync pulses. These pulses are provided so that horizontal synchronization is maintained during the vertical sync interval. The vertical sync pulses 15 each have a duration of approximately 27 microseconds. Each vertical interval contains six vertical sync pulses separated by positive going serrations each of which is approximately the width of the horizontal sync pulse.

Refer now to FIG. 2 which is a more detailed graphical display of a typical horizontal sync pulse. Each horizontal sync pulse consists of a blanking component 18 which blanks out the brightness or picture signal 27 during the horizontal sync interval. Superimposed on the blanking signal is a horizontal sync pulse 19 and a color reference burst 21. The color reference burst is positioned on the back porch 25 of the sync signal and consists of approximately 8 cycles of a 3.58 MHz subcarrier reference signal. The signal is present for color television transmission and is used to synchronize the phase of the 3.58 MHz oscillator in the color television receiver with the received video signal. The horizontal or line sync component 19 is approximately 5 microseconds wide and the leading and trailing edges thereof should have a rise time of less than 0.25 microseconds in duration. The rise times of the leading and trailing edges of the blanking signal should be no greater than 0.65 microseconds. The front porch 23 of the sync signal is approximately 1.3 microseconds wide whereas the back porch 18 is approximately 4 microseconds wide. In a television system, the blanking level 18 represents a black reference level, and the horizontal sync component 19, a blacker than black reference level, whereas the highest possible positive going portion of the brightness signal 27 establishes the white reference level. The horizontal and vertical sync components are combined with the brightness signal 27 to form a composite television signal which signal is then transmitted to a receiver.

Refer now to FIG. 3 which shows a schematic diagram of the preferred embodiment of the television monitoring system of this invention. The video input terminal 29 receives an incoming composite video signal and conveys it to a signal conditioner 31. The signal conditioner detects or isolates the various components of the incoming television signal and delivers each of these components to a separate sample and hold circuit 39–45. The signal conditioner also generates a pulse that is conicident timewise with the leading edge of the horizontal synchronization signal for setting line counter 33 and for resetting timing counter 37. In addition, signal conditional 31 generates a pulse that is coincident with the start of a new picture or field and which is coupled to line counter 33 via line 32 for resetting the line counter. Line counter 33 counts the horizontal sync pulses thereby providing line identification during each field of the input video signal. This information is conveyed to a decoder circuit 35 via line 26. A stable 5MHz oscillator 36 of any well-known type generates timing marks, each being 0.2 microseconds apart. The output of oscillator 36 is connected to timing counter 37 which counts the marks for interline timing. The output of the timing counter is a train of timing pulses spaced 0.2 microseconds apart which are coupled to the decoder 35 via line 38. The line sync signal from signal conditioner 31 resets the timing counter once each horizontal line interval or every 63.5 microseconds so that a new train of marker pulses are coupled to decoder 35 at the start of each horizontal line.

Decoder circuit 35 is comprised of dividing stages and multiple input NAND gates with each gate wired so that an appropriate gating signal is generated when each of a plurality of selected portions of the video input is received by signal conditioner 31. An example of a dividing stage is a Circuit Type Sn 7490, Decade Counter. Typical multiple input NAND gates are illustrated in the Texas Instruments TTL Integrated Circuit Catalog number CC 201 at pages 5-13 to 5-18 and are designated Circuit Type SN 7445, BCD to Decimal Decoder.

The decoder provides separate gating signals to each of the sample and hold circuits 39–45. The gating signals are electrically identical but are selectably programed in time to occur at the time of the associated monitored signal. Also, the time duration of the gate signal is also selectably programed to match the time interval of the associated monitored signal. Thus, it can be seen tha any signal portion occurring anywhere in the composite video signal can be separated from the composite video signal and stored in the sample and hold circuit. It should be appreciated that the preferred embodiment shows one gate for each signal monitored but that suitable programing of the decoder would allow multiple time gating to control one sample and hold circuit. Thus, a signal can be monitored once each picture, once each frame, once each line, or any other frequency desired.

It should be understood that the decoder is capable of generating a different gating signal every 0.2 microseconds thereby providing the monitor with the capability of monitoring the incoming composite video signal at every 0.2 microsecond interval. This, however, would necessitate the use of approximately 317 sample and hold circuits for temporarily storing the monitored portions of the incoming signal. It should be understood that while the leading edge of each gate is equalized into 317 intervals within a line, the width of each gate is quantized into (317-$n$) possible widths wherein $n$ is the quantum interval from 1 to 317 corresponding to the time interval from 0 to 63.4 μsec within a given horizontal line. In the preferred embodiment, only selected portions of the video signal are monitored. Thus, appropriate gating signals are generated, for example, at the beginning of the blanking signal, at the forward and trailing edges of the horizontal and vertical sync pulses, at the beginning and end of the color burst, and during selected portions of the video brightness signal. To do this, the aforementioned decoder circuit would have to be appropriately wired or programed. Techniques for wiring or programing decoders for generating selected timed gating signals are well known in the art and will not be discussed in detail since the circuitry involved is quite extensive and one of ordinary skill in the art could design such circuitry knowing the time position of the required gating signals.

The outputs of decoder 35 are connected to the signal conditioner 31, as will be discussed more fully below, and to a plurality of parallel aligned sample and hold circuits 39–45. While only four sample and hold circuits are shown in order to facilitate the description of the preferred embodiment, it should be understood that any desired number could be used.

Refer now to FIG. 4 for a more detailed description of a typical sample and hold circuit. A selected portion of an incoming video signal from signal conditioner 31 is coupled to a field-effect transistor (hereinafter FET) gate 47. Then a gating signal is provided on line 34 by decoder 35, the FET gate 47 is enabled thereby connecting the selected portion of the video signal to one terminal of an operational amplifier 51 which functions as a comparator. The other input to comparator 51 is the voltage across storage capacitor 53 which is fed to the comparator input along a negative feedback path 52. The output of the comparator is connected to the storage capacitor 53 via blocking diode 55. If the input signal from the signal conditoner 31 is greater than the output of the comparator, the capacitor is charged to a higher voltage level, and, if the input is less than the output of the comparator, blocking diode 55 prevents discharging of the capacitor 53 through the comparator. Thus, it can be seen that the sample and hold circuit serves as a peak signal detector. Capacitor 53 is provided with a discharge resistor 57 which is adjusted to provide a discharge time constant suitable for the parameter being measured. Thus, if the peak value of a signal is being measured, the time constant is large compared to the expected time the output signal is to be stored. If the average value of a signal is being measured, then a shorter time constant is required. A unity gain, operational amplifier 49 is provided as a buffer so that the time constant of the storage circuit 53–57 is not altered by succeeding components in the television monitoring system.

Referring back to FIG. 3, the respective outputs of the sample and hold circuits 39–45 are connected to a corresponding series of gates 40–46. These gates may be of any suitable type known in the art and are enabled by a scan oscillator 61 which may take the form of a typical ring counter. Thus, each of the gates are sequentially enabled as the output of the scan oscillator energizes a different gating circuit. The outputs of the sample and hold circuits are therefore sequentially connected via the gating circuits to an analog digital converter 63. When, for example, gate 40 is enabled, the output of sample and hold circuit 39 is connected to analog to digital converter 63 which converts the analog output of the sample hold circuit to binary coded decimal form. It should be understood that while only four gates 40–46 are shown, as many gates may be utilized as there are sample and hold circuits in order to provide the necessary access to the sample and hold circuits.

Scan oscillator 61 also provides address information on line 24 and, accordingly, the output of A/D converter 63 can be formed into a serial train of binary coded digits corresponding to the outputs of each of the sample and hold circuits 39–45. This train of digital information along with the address information from the scan oscillator 61 may be stored, for example, in a digital computer for later retrieval or for computer analysis to determine the quality of the video input information being received at terminal 29. The information can also be coupled to an analog telemeter system for sending the data via a telephone line to a remote terminal for real time monitoring of the quality of the video signal.

In operation, assume that the front porch, horizontal sync, back porch and a selected portion of the brightness signal are to be monitored. The front porch is received by signal conditioner 31 first and is isolated thereby, as will be more fully described hereinbelow, and coupled to the input of sample and hold circuit 39. At the same time that the front porch portion of the television signal is received by signal conditioner 31, the decoder 35 has been fed an appropriate number of timing pulses from counter 37 so that decoder 35 generates a gating pulse for sample and hold circuit 39. The sample and hold circuit 39 thus temporarily store the peak voltage level of the front porch signal. The next portion of the composite video signal to be received is the horizontal sync signal. This signal is isolated and coupled to the input of sample and hold circuit 41. At the same time the number of timing pulses received by decoder 35 from counter 37 has increased. Thus, the decoder no longer delivers a pulse to enable the input gate of circuit 39 but rather enables sample and hold circuit 41. Thus, the peak of the horizontal sync signal is stored in this sample and hold circuit. By the same process the back porch and brightness signals are stored in circuits 43 and 45, respectively.

Scan oscillator 61 then provides an enabling pulse to gate 40 which permits the stored analog signal in sample and hold circuit 39 to be fed to A/D converter 63. The stored front porch signal in circuit 39 is then converted to a binary coded form by the A/D converter 63. This signal is coupled to a storage unit (not shown) such as a computer tape along with the associated address information from scan oscillator 61 by any one of a number of well-known techniques. As an alternative the signal may be coupled to an analog telemeter system for sending the date via a telephone line to a remote terminal for real time monitoring of the video signal.

Next, the stored horizontal sync signal is conveyed to A/D converter 63 by enabling gate 42 with a pulse from scan oscillator 61. As before, this signal is also stored. Finally, the signals in sample and hold circuits 43 and 45 are sequentially accessed by enabling gates 44 and 46 respectively with a gating pulse from scan oscillator 61. It can be seen that any desired portion of a composite video signal can be isolated, sequentially accessed, converted to a binary coded decimal form and stored or analyzed or transmitted by the system of this invention.

Figures 5A, 5B:
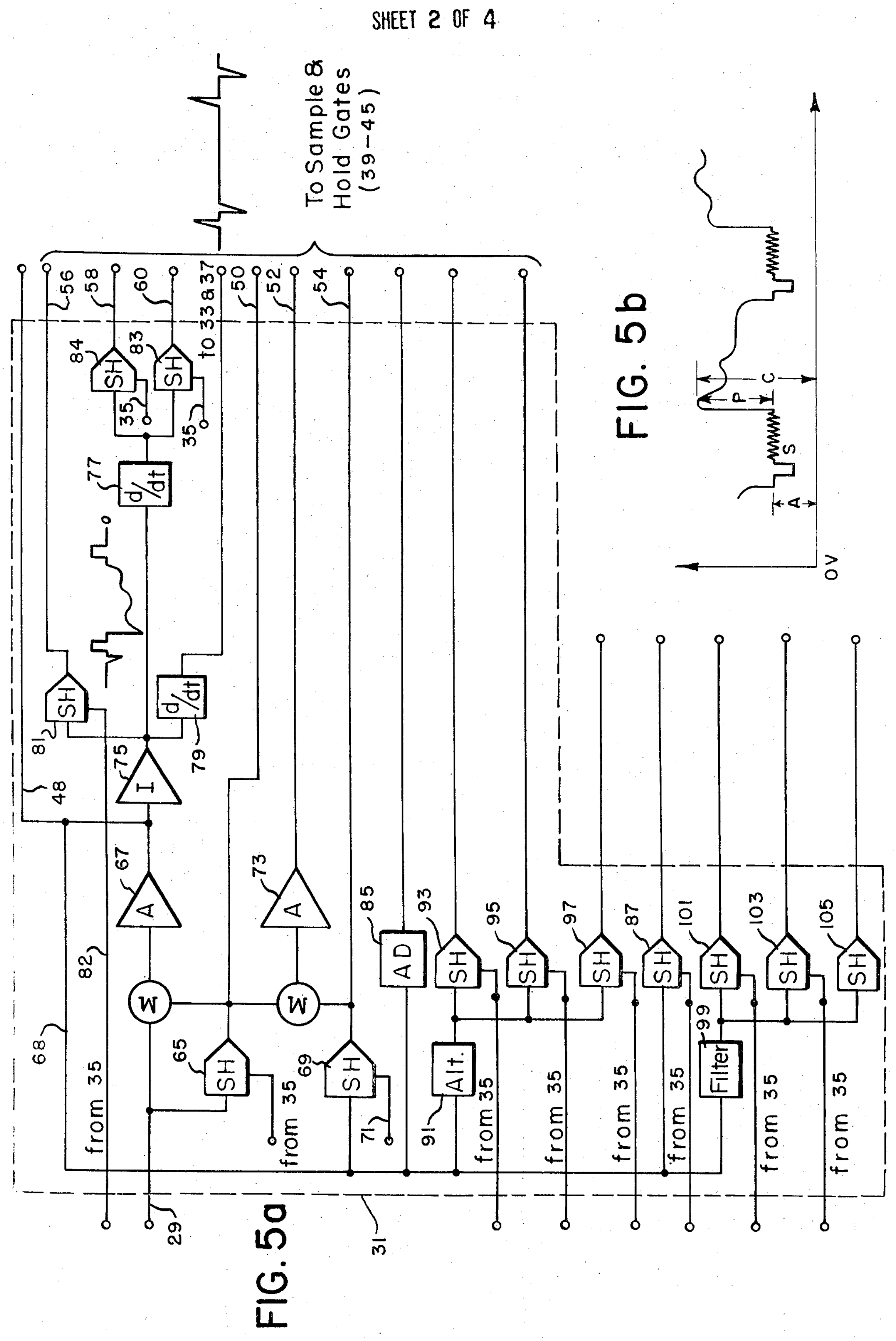

Refer now to FIGS. **5*a* and 5*b* for a more detailed discussion of the signal conditioner 31. FIG. 5*a* is a schematic diagram of a portion of the signal conditoner 31 and FIG. 5*b* shows one horizontal line of a typical composite television signal. The television signal received at terminal 29 is connected to the input of sample and hold circuit 65 and to operational amplifier 67. Sample and hold circuit 65 is gated by a pulse from decoder 35 when the leading edge of the front porch of the horizontal sync interval is received at terminal 29. The gating signal persists until the start of the leading edge of the horizontal sync component of the horizontal sync interval. Thus, the sample and hold circuit 65 stores the difference in potential between the front porch potential and a reference potential which may be, for example, zero volts. This voltage level is typically called the offset and is represented by the letter A in FIG. 5b. This stored signal is coupled to one of the sample and hold circuits 39–45 via line 50. The output of the sample and hold circuit 65 is connected to amplifier 67 where the offset signal A is subtracted from the composite input signal to derive a clamped output. This means that the front porch level is now clamped to reference potential or zero volts. The output of amplifier 67 is connected to one of the sample and hold circuits 39–45 via line 48 and is also connected via conductor 68 to the input of a second sample and hold circuit 69 which is gated by a gating signal on line 71 derived from the decoder 35. The gating signal on line 71 is generated at the end of the trailing edge of the blanking pulse and has a duration equal to the duration of the picture or brightness signal between horizontal synchronizing signals. Thus, sample and hold circuit 69 measures the peak video or brightness signal P as shown in FIG. 5*b*. The output of sample and hold circuit 69 is summed by operational amplifier 73 along with the offset output A of circuit 65 to provide the peak carrier signal which is represented by the letter C in FIG. 5b. The peak carrier signal C and the peak brightness signal P are coupled to the sample and hold circuits 39–45 via lines 52 and 54**, respectively.

Return now to the operational amplifier 67, the output of which is a composite video input signal having the front porch level thereof clamped at reference potential. This output is inverted by the inverter 75 and coupled to a pair of parallel differentiation circuits 77 and 79, and to a sample and hold circuit 81. Sample and hold circuit is gated by a synchronizing gate signal from decoder 35 via line 82. This gating signal is initiated at the leading edge of the horizontal synchronizing component and terminates at the trailing edge thereof. The output of circuit 81 is therefore a measure of the height of the synchronizing pulse with respect to reference potential which is represented by the letter S in FIG. 5*b*. This signal is coupled to one of the sample and hold circuits 39–45 via line 56.

Circuit 79 differentiates the horizontal sync signal to thereby provide the relative positions of the leading and trailing edges of the snyc pulse and further provide information as to the separation of the sync pulses from each other so that the exact duration of line can be ascertained. The positive portion of this differentiated signal is fed to line counter 33 and to timing counter 37 to establish a reference for generating the gating signals that coincide with the various selected components of the composite television signals. Circuit 77 differentiates the inverted output of the amplifier 67 and the output thereof is coupled to a pair of sample and hold circuits 83 and 84. Sample and hold circuit 84 is gated at the beginning of the horizontal synchronizing pulse by a signal derived from decoder 35 and the output thereof represents the slope of the leading edge of the horizontal sync pulse. Sample and hold circuit 83 is gated at the beginning of the vertical gating pulses and the output thereof represents the slope of the leading edge of the vertical sync pulses. These signals are coupled to the sample and hold circuits 39–45 via lines 45 and 60, respectively.

Returning to amplifier 67, the output thereof is also connected via line 68 to an average value detector 85 which averages the video signal over its period. The output of detector 85 is a DC signal and is coupled to one of the sample and hold circuits 39–45. The output of amplifier 67 is also connected to sample and hold circuit 87. When a gating signal from decoder 35 that is conicident timewise with the start of the color burst signal is coupled to circuit 87, the peak amplitude of the color burst signal is temporarily stored therein.

The function of the remaining circuitry of FIG. 5*a* can best be illustrated by making reference to FIG. 6 which is a graphical display of an example of a typical color test signal which is inserted in the composite video signal immediately following the vertical sync interval in that portion of the television signal that is blanked from appearing on the screen of the receiver. The test signal occupies three consecutive horizontal line intervals of the television signal and is comprised of a reference color burst of at least eight cycles of 3.58 MHz subcarrier. A 180° out-of-phase reference burst is superimposed on a DC plateau having a selected scale value of 50 percent. A magenta color burst, also of at least eight cycles of 3.58 MHz subcarrier, is superimposed on a plateau having a scale value of 0 percent and, finally, a cyan reference burst is superimposed upon a plateau having a scale value of 100 percent. This waveform may be taken as a typical example of the type of color test signal utilized in television broadcasting and functions to provide information as to the linearity of the equipment generating the television signal and as to the phase relationships of the color components of the video signals.

Refer now back to FIG. 5*a* where there is shown a low pass filter 91 which filters out the high frequency or color burst signal portions of the color test signal. Thus, the color test signal minus the color bursts is fed to each of three sample an hold circuits 93, 95, and 97. Sample and hold circuit 93 is enabled when the 0 percent reference level of the test signal occurs. The output of circuit 93 should represent a zero potential level. The gating signal is derived from decoder 35 and the time position thereof is known since the position of the color test signal with respect to the vertical sync interval is known. In the same manner, sample and hold circuit 95 is gated when the 50 percent reference level occurs and finally, sample and hold circuit 97 is gated when the 100 percent reference level occurs.

The color burst signal amplitudes are measured by coupling the output of amplifier 67 to a high pass filter 99 which blocks out the reference plateaus of the color test signal leaving the four color burst signals. Sample and hold circuit 101 is enabled when the zero reference plateau occurs and the output thereof is a measure of the peak magenta color burst signal. Sample and hold circuit 103 is enabled when the 50 percent reference plateau occurs, and the output thereof is a measure of the peak amplitude of the 180° out-of-phase reference burst. Finally, sample and hold circuit 105 is enabled when the 100 percent reference plateau occurs and the output thereof represents the peak amplitude of the cyan color burst.

Refer now to FIG. 7 which shows a block diagram of the preferred embodiment of that portion of the signal conditioner 31 which determines the difference in phase between the magenta and cyan test signals and a corresponding generated reference signal. The video input signal is fed to input terminal 29 and then to a gated amplifier 105 which amplifies the video input signal only during the occurrence of the color burst signal which is illustrated in FIG. 2 at number 21. The output of amplifier 105 synchronizes a 3.58 MHz oscillator 107. The output of the 3.58 MHz oscillator is delivered to a quadrature generating circuit 108 which generates two signals each having the same frequency as the output of oscillator 107 but which are 90° out of phase with respect to each other. Quadrature circuits are well known in the art and any suitable such circuit may be used. The first output of generator 108, designated $Y_1$, is fed to the first input terminals of matrix circuits 109 and 110. The other output of the generator, designated $Y_2$, is fed to the other terminal of matrix circuits 109 and 110. It is well known that suitable summations of sinusoidal signals being 90° out of phase with respect to each other can provide any phase angle required. Matrix circuit 109 sums the outputs of generator 108 to provide the magenta reference signal which is 60.80° out of phase with respect to the color burst input to the amplifier 105. Matrix circuit 110 provides the cyan reference which is 283° out of phase with respect to the color burst input.

The magenta reference output of matrix 109 is connected to a phase detector 111. Phase detector 111, which may be of any suitable type known in the art, generates a DC output signal having an amplitude that is proportional to the difference in phase between two signals and a polarity that is dependent upon phase lead or lag. The video input signal at terminal 29 is coupled to a gated amplifier 113 which amplifies the input during the occurrence of the magenta test signal. The output of amplifier 113 is connected to phase detector 111 where the phase of the magenta test signal generated by matrix 109 is compared with the reference burst of the input signal. The difference is in the form of a DC signal which is fed to a pair of sample and hold circuits 114 and 116 which are also gated during the occurrence of the magenta test burst. The polarity of the outputs of the sample and hold circuits 114 and 116 is dependent upon whether the magenta test signal leads or lags the generated test signal. Two sample and hold circuits are required since the circuit 114 provides a positive output only when the input thereto is positive. Circuit 116 has its diode 55 (see FIG. 4) reversed so that it provides negative output only when the input thereto is negative. Thus the two sample and hold circuits determine whether the magenta test signal leads or lags the generated test signal.

The output matrix 110 is coupled to a second phase detector 115. At the same time, the video input to the terminal 29 is coupled to a gated amplifier 117 which is gated during the occurrence of the cyan test gate. The output of the amplifier is coupled to phase detector 115 where it is compared with the generated cyan reference output of matrix 110. The output of phase detector 115 is in the form of a DC signal and is conveyed to a second pair of sample and hold circuits 118 and 119 which are gated during the cyan test burst interval. Each of the outputs of the pairs of sample and hold circuits are conveyed to appropriate sample and hold circuits for temporary storage.

It may be desired to monitor the selected portions of the composite television signal at less than the line rate. Thus, for example, it may be desirable to monitor a line interval of a television signal only once each field or once every 525 lines. This may be accomplished by having the line counter 33 generate a pulse to inhibit the operation of decoder 35 during those line intervals in which no signal detection is to occur. By this technique, a sample of the television signal can be obtained over a greater time interval and yet not utilize excessive storage space for storing the accumulated data.

The foregoing was a detailed description of the preferred embodiment of the invention. It should be understood, however, that there are other embodiments that come within the spirit and scope of the invention as defined by the appended claims.

We claim:

1. In a television system wherein a plurality of signals are combined to form a composite television signal, a composite television signal monitor comprising;
- means for detecting selected portions of said composite television signal,
- means for temporarily storing each of said detected portions, and
- means for sequentially sampling each of said stored signals.

2. The monitor of claim 1 further comprising:
- means for converting said sampled signals to binary coded decimal signals, and
- means for combining said binary coded decimal signals to form a serial train of data.

3. The monitor of claim 2 wherein said means for detecting selected portions of said composite television signal comprises;
- for determining when each of said selected portions of said television signal occur, and
- means responsive to said occurrence determining means for isolating the desired signal characteristic of each of said selected portions upon the occurrence of said selected portions.

4. The monitor of claim 3 wherein said means for detecting the occurrence of each of said selected portions of said composite signal comprises;
- means for detecting the horizontal sync pulses,
- means for differentiating said sync pulse to thereby generate an impulse function coincident with the leading edge of said sync pulse,
- counter means for generating a train of pulses, said impulse function synchronizing said of said of pulses with the leading edge of said horizontal synchronizing pulse, and
- logic means for generating a gating pulse upon the occurrence of each said selected portions of said composite television signal, said selected portions being in predetermined time relationship with respect to said synchronizing pulses.

5. The monitor of claim 4 wherein said means for temporarily storing said detected portions comprises;
- a plurality of sample and hold circuits, said circuits each being gated to receive said isolated signal characteristics by said gating pulses from said logic means.

6. In a television system wherein a plurality of signals are combined to form a composite television signal, a composite television signal monitor comprising;
- means for detecting selected portions of said composite television signal,
- means for temporarily storing each of said detected portions, and
- means for converting each of said detected portions to a continuous signal.

7. The composite television signal monitor of claim 6 wherein said means for converting each of said detected portions to a continuous signal comprises scan oscillator means for sampling each of said stored signals,
- means for converting said sampled signals to binary coded decimal signals, and
- means for combining said binary coded decimal signals to form a serial data train.

8. In a television system wherein a plurality of signals are combined to form a composite television signal, the method of monitoring said composite television signal comprising the steps of;
- detecting selected portions of said composite television signal,
- temporarily storing each of said detected portions, and
- sequentially sampling each of said stored signals.

9. The method of claim 8 further comprising;
- converting said sampled signals to binary coded decimal signals, and
- combining said binary coded decimal signals to form a serial train of data.

10. The method of claim 9 wherein said detecting selected portions of said composite television signal step comprises the steps of;
- determining when each of said selected portions of said television signal occur, and
- isolating the desired signal characteristic of each of said selected portions upon the occurrence of said selected portions.

11. The method of claim 10 wherein said detecting the occurrence of each of said selected portions of said composite signal step further comprises the steps of;
- detecting the horizontal sync pulses, differentiating said sync pulse to thereby generate an impulse function coincident with the leading edge of said sync pulse, generating a train of pulses wherein said impulse function synchronizes said train of pulses with the leading edge of said horizontal synchronizing pulse, and generating a gating pulse upon the occurrence of each of said selected portions of said composite television signal, said selected portions being in predetermined time relationship with respect to said synchronizing pulses.

* * * * *

UNITED STATES PATENT OFFICE
CERTIFICATE OF CORRECTION

Patent No. 3,792,195 Dated February 12, 1974

Inventor(s) Kenneth A. Wilson and Graham D. Bogel

It is certified that error appears in the above-identified patent and that said Letters Patent are hereby corrected as shown below:

Column 1, line 42, "various signals" should read --various component signals--.
Column 2, line 32, "conditional" should read -- conditioner--.
Column 3, line 26, "conicident" should read --coincident--;
line 29, "conditional" should read --conditioner--;
line 53, "Sn 7490" should read --SN 7490--;
line 66, "tha any" should read --that any--.
Column 4, line 6, "or any" should read --or at any--;
line 16, "equalized" should read --quantized--;
line 18, "wherein n" should read --where n--;
line 47, "Then a" should read --When a--.
Column 5, line 16, "analog digital" should read --analog to digital--;
line 61, "peak of the" should read --peak value of the--.
Column 6, line 7, "sending the date" should read --sending the data--.
Column 7, line 1, "circuit is" should read --circuit 81 is--;
line 20, "of the amplifier" should read --of amplifier--;
line 30, "lines 45 and 60" should read --lines 58 and 60--;
line 39, "is conicident" should read --is coincident--.
Column 10, line 13, "of each said" should read --of each of said--.

Signed and sealed this 20th day of August 1974.

(SEAL)
Attest:

McCOY M. GIBSON, JR.
Attesting Officer

C. MARSHALL DANN
Commissioner of Patents

USCOMM-DC 60376-P69
☆ U.S. GOVERNMENT PRINTING OFFICE : 1969 O—366-334.